United States Patent [19]

Hassler

[11] Patent Number: 4,847,315

[45] Date of Patent: Jul. 11, 1989

[54] NOVEL AMINO RESINS USEFUL IN SIZING PAPER AND THEIR USE

[75] Inventor: Thord G. G. Hassler, Helsingborg, Sweden

[73] Assignee: W. R. Grace AB, Helsingborg, Sweden

[21] Appl. No.: 56,920

[22] Filed: Jun. 3, 1987

[30] Foreign Application Priority Data

Jun. 5, 1986 [GB] United Kingdom ................ 8613652

[51] Int. Cl.[4] ...................... C08G 12/06; C08G 12/18; C08G 69/26; C08G 65/26
[52] U.S. Cl. .................................. 524/357; 524/800; 524/843; 524/845; 528/246; 528/263; 528/340; 528/341; 528/367; 528/405
[58] Field of Search ............... 528/268, 341, 367, 405, 528/246, 263, 340; 524/800, 843, 845

[56] References Cited

U.S. PATENT DOCUMENTS

| | | | |
|---|---|---|---|
| 3,403,113 | 9/1968 | Diethelm et al. | 528/405 X |
| 3,793,279 | 2/1974 | Lipowski | 528/343 X |
| 4,407,994 | 10/1983 | Bankert et al. | 524/107 |
| 4,507,466 | 3/1985 | Tomalia et al. | 528/363 X |
| 4,558,120 | 12/1985 | Tomalia et al. | 528/363 |
| 4,568,737 | 2/1986 | Tomalia et al. | 528/425 X |
| 4,631,337 | 12/1986 | Tomalia et al. | 528/423 X |

Primary Examiner—Earl Nielsen
Attorney, Agent, or Firm—Steven T. Trinker

[57] ABSTRACT

A water-soluble, thermosetting resin comprising units derived from tris(2-aminoethyl)amine, and preferably units derived from dicyandiamide and/or epichlorohydrin, is useful as an accelerator in paper sizing, e.g. using an alkyl ketene dimer.

14 Claims, No Drawings

NOVEL AMINO RESINS USEFUL IN SIZING PAPER AND THEIR USE

This invention relates to amino resins useful in the sizing of paper, to compositions containing them, and to their use.

Alkyl ketene dimers, usually containing 14 to 18 carbon atoms in the alkyl radical, are well established sizing agents for paper. They are usually added to the furnish as a dispersion. The sizing action is believed to be caused by a chemical reaction between the ketene dimer and the hydroxyl groups of the cellulosic fibers in the paper. This reaction is by no means instantaneous, and it is some time before the full sizing effect is developed in the paper sheet. In an effort to avoid this disadvantage, there have been numerous proposals to include in the furnish, along with the alkyl ketene dimer, also a resin to promote the chemical reaction between the ketene dimer and the hydroxyl groups of the cellulose.

By way of example, reference may be made to U.S. Pat. No. 4407994, which describes the use, as sizing accelerators for use with alkyl ketene dimers, of water-soluble nitrogen-containing reaction products derived by reaction of
 (1) a water-soluble polyamino-polyamide;
 (2) an epihalohydrin; and
 (3) a composition comprising specified amounts of bis(hexamethylene)triamine.

The introductory part of this United States patent includes an extensive list of previous proposals of sizing accelerators for use with alkyl ketene dimers. However, known sizing accelerators are still not entirely satisfactory in that they do not provide for some applications the desired rate of sizing development. In addition, it is desirable to be able to obtain for some purposes an even harder sizing with an alkyl ketene dimer than is possible with known sizing accelerators.

The present invention provides novel sizing accelerators suitable for use with alkyl ketene dimers to accelerate the rate of sizing development. It has been found that the amine tris(2-aminoethyl)amine, i.e. the compound of formula:

N(CH$_2$CH$_2$NH$_2$)$_3$ can be used to produce resins which are very valuable sizing accelerators when used with an alkyl ketene dimer sizing agent. These resins may be made in any one of the following ways:

(1) One type of resin based on tris(2-aminoethyl)amine, which may be used as a sizing accelerator with an alkyl ketene dimer, may be made by reacting, in an aqueous medium at an acid pH, formaldehyde, dicyandiamide, a salt of tris(2-aminoethyl)amine, and optionally an ammonium salt. The reaction may be brought about by refluxing an aqueous solution of these starting materials until the viscosity ceases to increase, usually 1 to 4 hours. The ratio of dicyandiamide (moles) to tris(2-aminoethyl)amine (equivalents) may be from 1:0.2 to 1:1.2. The amount of formaldehyde, which may be added in one or more portions, should be what is required to form a product having a minimum viscosity of 15 cps at 50% total solids at room temperature but which does not form a gel.

(2) A second type of resin, also useful as a sizing accelerator, may be made by reacting tris(2-aminoethyl)amine in an aqueous medium with an epihalohydrin, e.g. epichlorohydrin. If desired, the tris(2-aminoethyl)amine may first be reacted with dicyandiamide, e.g. by heating together in the absence of a solvent, and the reaction product then treated with the epihalohydrin.

This type of polymer is prepared by adding, to an aqueous solution of tris(2-aminoethyl)amine (or of a reaction product of this amine with dicyandiamide) at room temperature, epichlorohydrin in a ratio of 3-7 moles of epichlorohydrin per mole of tris(2-aminoethyl)amine. The temperature of the reaction mass increases by the heat of reaction. The temperature is adjusted to 50°-95° C. and the reaction is continued until a viscosity of 15-1000 cps has been reached for a 25% solution. The pH of the reaction mass must be above 7.0 and it may be necessary to add a base such as sodium hydroxide to maintain this pH. When the desired viscosity has been reached, further reaction is prevented by cooling and addition of acid to give an acid pH, preferably below 4.0.

(3) The tris(2-aminoethyl)amine is first reacted with an aliphatic dicarboxylic acid containing 3 to 8 carbon atoms under anhydrous conditions to produce a polyamidoamine. This polyamide may then be reacted with an epihalohydrin, e.g. epichlorohydrin, and optionally a polyamine, e.g. bis(hexamethylene)triamine, or with a precondensate of an epihalohydrin and such a polyamine. Alternatively the polyamidoamine may be reacted with formaldehyde, dicyandiamide, and an ammonium salt, e.g. chloride or a salt of tris(2-aminoethyl)amine, and optionally also with urea and/or an epihalohydrin and/or acrylamide. In every case, the resin finally obtained should be water-soluble and thermosetting.

The first reaction to form the polyamidoamine from the dibasic acid and tris(2-aminoethyl)amine is performed by first mixing the di-acid and the polyamine in a molar ratio of from 1:1 to 2:1. This mixing is accompanied by a considerable rise in temperature, and the temperature is then further raised to the reaction temperature of from 140° C. to 210° C. Water is formed as the reaction proceeds and then evaporates from the reaction mass. The reaction is complete when essentially all acid functions of the di-acid have been converted to amide. The reaction mass is then cooled to about 140° C. and water is rapidly added in an amount sufficient to form a less than 70% total solids solution of the polyamidoamine in water. This polyamidoamine is then used in the further reactions described below.

For reaction with epichlorohydrin, the polyamidoamine is first diluted further with water to form a 10-30% solution. Epichlorohydrin is then added in an amount corresponding to from 0.3 to 3, preferably 1.5 to 2.0, moles per mole of amine in the polyamidoamine. Epichlorohydrin reacts with the amine and also performs some cross linking of the resin which increases its molecular weight and hence also its viscosity. Heating preferably to 50° to 80° C. is required to obtain a reasonable reaction rate. The reaction proceeds only at alkaline pH and addition of a base, e.g. sodium hydroxide, may be necessary to ensure this. When a viscosity of 25 to 1000 cps (at 25% concentration) has been reached, the reaction is terminated by addition of acid (e.g. hydrochloric acid) to bring the pH to an acid pH, preferably below 5. The resin is then cooled to room temperature.

A polyamine, or a precondensate of polyamine and epichlorohydrin, can also be reacted with the polyamidoamine under the same reaction conditions.

Another type of useful resin is prepared by condensing, at acid pH, the polyamidoamine with formaldehyde, dicyandiamide and an ammonium salt. The reaction may be brought about by refluxing until the viscosity remains unchanged, usually 1 to 4 hours, a solution of dicyandiamide, polyamidoamine, ammonium salt and formaldehyde. The ratio of dicyandiamide (moles) to the sum of ammonium salt (equivalents) and polyamidoamine (equivalents) should be 1 to 0.7–1.3, preferably 1:1. Formaldehyde is used in an amount required to form a reaction product having a minimum viscosity of 15 cps at 50% total solids. This amount may be easily determined by those skilled in the art. The formaldehyde may be added in two or more portions.

Whichever method of producing the resin is used, the final product is an aqueous solution of a water-soluble thermosetting resin based on tris(2-aminoethyl)amine having a viscosity generally within the range of 10 to 1000 cps at room temperature and a pH of about 2 to about 8 and containing 2 to 50% by weight, preferably 20 to 30%, of solids which is suitable for addition to a paper making furnish, in combination with an alkyl ketene dimer, to improve the rate at which the latter reacts with the cellulosic fibers. The resin and the alkyl ketene dimer may be added separately to the paper furnish or may be premixed before addition. The amount added should, in either case, be from 0.01 to 1.5% of the resin and from 0.04 to 0.5% of the alkyl ketene dimer, both percentages being by weight based on the total weight of the produced paper.

It is within the scope of the invention to include in the materials to be included in the paper furnish not only the alkyl ketene dimer sizing agent, and the novel sizing accelerators described above, but also other compatible ingredients normally used in the formulation of dispersions of ketene dimers, e.g. cationic starch and other cationic resins normally used as emulsifiers for alkyl ketene dimers, wet strength agents, retention aids, dispersants and biocides.

The water-soluble thermosetting polymers of the present invention are useful in conjunction with alkyl ketene dimer sizes. The ratio of polymer to alkyl ketene dimer is usually 1:3 to 3:1. The polymers improve the rate of sizing development, the resistance of the paper to warm aqueous liquids, and the retention of ketene dimer during papermaking.

The following Examples illustrate the invention.

EXAMPLE 1

To a 250 ml round-bottom flask equipped with heating mantle, a mechanical stirrer, reflux condenser, contact thermometer and dropping funnel was added 22.35 g tris(2-aminoethyl)amine (0.15 mole). Concentrated hydrochloric acid (36%) was added very carefully over 1 hour. The temperature was maintained between 10° C.–25° C. by immersion in an ice/water bath. A total of 63.87 g of acid (0.63 mole) was required to solubilize the amine salt. To this was added 37.8 g (0.45 mole) dicyandiamide and 45.15 g of 29.9% formaldehyde solution (0.45 mole). The reaction mixture was heated at reflux for 2 hours after which time a further 7.52 g formaldehyde solution (0.075 mole) was added. The reaction mixture was maintained at reflux for a further 30 minutes after which time 7.52 g of formaldehyde solution (0.075 mole) was added. The reaction mixture was maintained at reflux for 1 hour before cooling to room temperature. The final product consisted of a syrupy liquid of 52.1% by weight solids content.

EXAMPLE 2

To a 500 cm$^3$ round bottom flask equipped with a mechanical stirrer, reflux condenser, dropping funnel, heating mantle and contact thermometer was added 14.6 g (0.1 mole) tris(2-aminoethyl)amine and 105 ·g deionised water. 55.5 g (0.6 mole) epichlorhydrin was added dropwise over 30 minutes. The temperature was allowed to rise to 65° C. during the addition by virtue of the exothermic reaction. The pH of the reaction mixture decreased during the epichlorhydrin addition from pH 12.3 initially to pH 6.9. The reaction mixture was then heated to 70° C. and maintained at this temperature for 2½ hours. The pH of the reaction mixture had decreased further to pH 3.5. The addition of 85 g 1M NaOH raised the pH to 7.5 and a further 1.46 g (0.01 mole) tris(2-aminoethyl)amine was added and the mixture was heated at 70° C. for a further hour. The reaction was terminated by adding 105 g H$_2$O and adjusted to pH 4 with a hydrochloric acid. The resin solution was a clear yellowish liquid having a low viscosity (17 cps) and 19.5% total solids content.

EXAMPLE 3

To a 500 ml round-bottom flask equipped with a mechnical stirrer, reflux condenser, contact thermometer, heating mantle and dropping funnel was added 75 g deionised water and 14.6 g tris(2-aminoethyl)amine (0.1 mole). 37 g of epichlorohydrin (0.4 mole) was added dropwise over 30 minutes. The temperature of the reaction mixture was maintained between 25° C.–30° C. by periodic immersion in an ice/water bath.

The reaction mixture, at pH 9, was then heated to 70° C. and maintained at this temperature for 3 hours. 75 g of 1 molar hydrochloric acid were then added and the mixture was cooled to room temperature. The final product consisted of a clear liquid having a 25.5% by weight solids content.

EXAMPLE 4

.84 grams dicyandiamide were added to 152.08 grams tris(2-aminoethyl)amine (96%) in a reaction flask equipped as in Example 2. The mixture was heated to 130° C. and an exothermic reaction took place with evolution of ammonia. When all ammonia had been evolved, the reaction mass was further heated to 180° C. for 60 minutes. The reaction mass was then cooled to 120° C. and 70 grams water were added. The product was an orange dispersion with a solids content of 58.8%.

The resin dispersion so prepared was diluted to 25% total solids. 108 grams of this solution was heated to 60° C. 71 grams epichlorohydrin were added over 15 minutes with heating to 60° C. The reaction product was cooled to room temperature and adjusted to pH=5 with formic acid. The solids content of the clear resin solution obtained was 15.5% and viscosity was 24 cps.

EXAMPLE 5

An emulsion of Alkyl ketene dimer prepared from a mixture of palmitic and stearic acid was prepared in the following manner:

50 parts of cationic corn starch were added to 742 parts of water. The slurry was heated to 90° C. and this temperature was maintained for 30 minutes to cook the starch. 8.0 parts of sodium ligninsulfonate and 200 parts of alkyl ketene dimer were added during stirring and the mixture was then passed through a piston-type homogenizer at a pressure of 200 bar. The homogenized premix was diluted with water to an alkyl ketene dimer content of 5%.

A portion of this emulsion was diluted with water to a ketene dimer solids content of 0.16%.

EXAMPLE 6

The resin prepared in accordance with example 1 was added to the 5% emulsion described in example 5 and water was added to provide an aqueous sizing composition containing 0.13% of the ketene dimer and 0.17% of the resin.

EXAMPLES 7 TO 9

Resins prepared in accordance with examples 2, 3, and 4 respectively were combined with the 5% alkyl ketene dimer emulsions described in Example 5 and water was added to provide three aqueous sizing compositions each containing 0.13% of the ketene dimer and 0.17% of the resin.

EXAMPLE 10

The aqueous dispersions prepared in Examples 5 to 9 were applied as sizes to 65 g/m$^2$ laboratory made unsized hand made paper sheets made from bleached hardwood pulp in the following way:

The size dispersions of examples 5 to 9 were all diluted ten times with water and the pH was adjusted to 8.0. A sheet of paper was immersed in the dispersion and then pressed between blotting paper to a wet pick up of 70%. Thereafter, the sheet was oven dried at 90° C. over a specific period of time (curing time). The degree of sizing was then immediately determined using the Cobb$_{60}$ test (SCAN/P 12:64). This procedure gave the results summarized in Table 1 below:

TABLE 1

| | Sizing Degree (Cobb$_{60}$) - after three different Curing Times at 90° C. | | |
|---|---|---|---|
| Example No. | 90 seconds | 130 seconds | 180 seconds |
| 5 (0.16% dimer solids content) | >100 | >100 | 30 |
| 6 | 69 | 36 | 20 |
| 7 | 63 | 32 | 20 |
| 8 | 100 | 75 | 20 |
| 9 | 60 | 27 | 20 |

EXAMPLE 11

Sizing efficiency was evaluated for the emulsions prepared in examples 5 to 7 in the following way:

A furnish of bleached sulfate birch pulp was prepared at 0.35% consistency. The pH was adjusted to 8 and the diluted sizing emulsion was added to the pulp furnish to give a ketene dimer amount corresponding to 1.0 kg ketene dimer per ton of fiber. A sheet of paper was formed from the stock having a basis weight of 65 g/m$^2$. The sheet was pressed between blotting papers at a pressure of 5 bar for 5 minutes and subsequently cured at 90° C. for a predetermined period of time (curing time) The results obtained in the sizing tests are summarized in Table 2 below.

TABLE 2

| | Degree of Sizing (Cobb$_{60}$) - at three different Curing Times at 90° C. | | |
|---|---|---|---|
| Example No. | 150 seconds | 165 seconds | 180 seconds |
| 5 (0.16% dimer | >100 | >100 | 65 |
| 6 | 65 | 35 | 23 |

TABLE 2-continued

| | Degree of Sizing (Cobb$_{60}$) - at three different Curing Times at 90° C. | | |
|---|---|---|---|
| Example No. | 150 seconds | 165 seconds | 180 seconds |
| 7 | >100 | 55 | 28 |

EXAMPLE 12

A 5% aqueous alkyl ketene dimer emulsion was prepared as in example 5. A resin prepared according to example 1 was combined with this ketene dimer emulsion in 1:1 ratio and the composition was further diluted with watr to a final ketene dimer content of 1%. The emulsion so prepared was applied as internal sizing agent on a pilot paper machine. An emulsion according to example 5, diluted to 1% and the same emulsion to which poly(diallydimethylammoniumchloride) had been added in 1:1 ratio were also evaluated for comparison. The following conditions were used:

Bleached hardwood: 61%
Bleached softwood: 24%
Calcined carbonate: 15%
pH: 7.5
Moisture content: 6.5%

The size was applied at two dosage levels and the sizing was measured as "off machine" ink penetration, i.e. water resistance of the sheet immediately after paper manufacture. The results obtained are shown in Table 3.

TABLE 3

| Cationic resin added to the paper pulp | Ink penetration time after machine sizing (seconds) |
|---|---|
| None | 0 |
| Resin of Example 1 at 1.2 kg per ton pulp | 1100 s |
| Resin of Example 1 at 0.77 kg per ton pulp | 500 s |
| Polydiallyldimethylammoniumchloride (polyDIMDAC) added to the pulp at | |
| 1.2 kg per ton pulp | 600 s |
| 0.77 kg per ton pulp | 20 s |

What is claimed is:

1. A water-soluble thermosetting resin comprising the reaction product of tris(2-aminoethyl)amine and:
   (a) formaldehyde, dicyandiamide and optionally an ammonium salt; or
   (b) an epihalohydrin; or
   (c) an aliphatic dicarboxylic acid containing about 3 to 8 carbon atoms and an epihalohydrin; or
   (d) an epihalohydrin and dicyandiamide; or
   (e) an aliphatic dicarboxylic acid containing about 3 to 8 carbon atoms, an epihalohydrin and a polyamine; or
   (f) an aliphatic dicarboxylic acid containing about 3 to 8 carbon atoms, formaldehyde, dicyandiamide, an ammonium salt, and, optionally, urea and/or epihalohydrin and/or acrylamide.

2. The water-soluble thermosetting resin of claim 1 comprising the reaction product of tris(2-aminoethyl)amine, formaldehyde, dicyandiamide and optionally an ammonium salt.

3. The water-soluble, thermosetting resin of claim 2 wherein the mole ratio of units derived from dicyandiamide to units derived from tris(2-aminoethyl)amine is from about 1:0.2 to 1:1.2.

4. The water-soluble, thermosetting resin of claim 1 comprising the reaction product of tris(2-aminoethyl)amine and an epihalohydrin.

5. The water-soluble, thermosetting resin of claim 4, wherein the epihalohydrin is epichlorohydrin.

6. The water-soluble, thermosetting resin of claim 4, wherein the mole ratio of units derived from the amine is from about 3:1 to about 7:1.

7. The water-soluble thermosetting resin of claim 1 comprising the reaction product of tris(2-aminoethyl)amine, an aliphatic dicarboxylic acid containing about 3 to 8 carbon atoms and an epihalohydrin.

8. The water-soluble thermosetting resin of claim 1 comprising the reaction product of tris(2-aminoethyl)amine, an epihalohydrin and dicyandiamide.

9. The water-soluble thermosetting resin of claim 1 comprising the reaction product of tris(2-aminoethyl)amine, an aliphatic dicarboxylic acid containing about 3 to 8 carbon atoms, an epihalohydrin and a polyamine.

10. The water-soluble thermosetting resin of claim 1 comprising the reaction product of tris(2-aminoethyl)amine, an aliphatic dicarboxylic acid containing about 3 to 8 carbon atoms, formaldehyde, dicyandiamide, an ammonium salt, and, optionally urea and/or an epiphalohydrin and/or acrylamide.

11. A process for preparing a water-soluble theromosetting resin according to claim 1 which comprises reacting, in an aqueous medium at an acidic pH, formaldehyde, dicyandiamide, a salt of tris (2-aminoethyl)amine and, optionally, an ammonium salt.

12. A process for preparing a water-soluble thermosetting resin according to claim 1 which comprises reacting, in an aqueous medium, tris(2-aminoethyl)amine with an epihalohydrin, and optionally dicyandiamide.

13. A process for preparing a water-soluble thermosetting resin according to claim 1 which comprises reacting tris(2-aminoethyl)amine with an aliphatic dicarboxylic acid containing 3 to 8 carbon atoms under anhydrous conditions to produce a polyamidoamine and then reacting the polyamidoamine either (1) with an epihalohydrin and, optionally, a polyamine or with a precondensate of an epihalohydrin and a polyamine or (2) with formaldehyde, dicyandiamide, an ammonium salt or a salt of tris(2-aminoethyl)amine and, optionally, with urea and/or an epihalohydrin and/or acrylamide.

14. An aqueous solution comprising 2 to 50% by weight of a water-soluble thermosetting resin as claimed in claim 1, an emulsifier, and an alkyl ketene dimer.

* * * * *